V. N. DMITRIFF.
TREE SAWING APPARATUS.
APPLICATION FILED MAY 21, 1919.

1,337,395.

Patented Apr. 20, 1920.
3 SHEETS—SHEET 1.

INVENTOR
Vasily N. Dmitriff
BY
Adam E Schatz
ATTORNEY

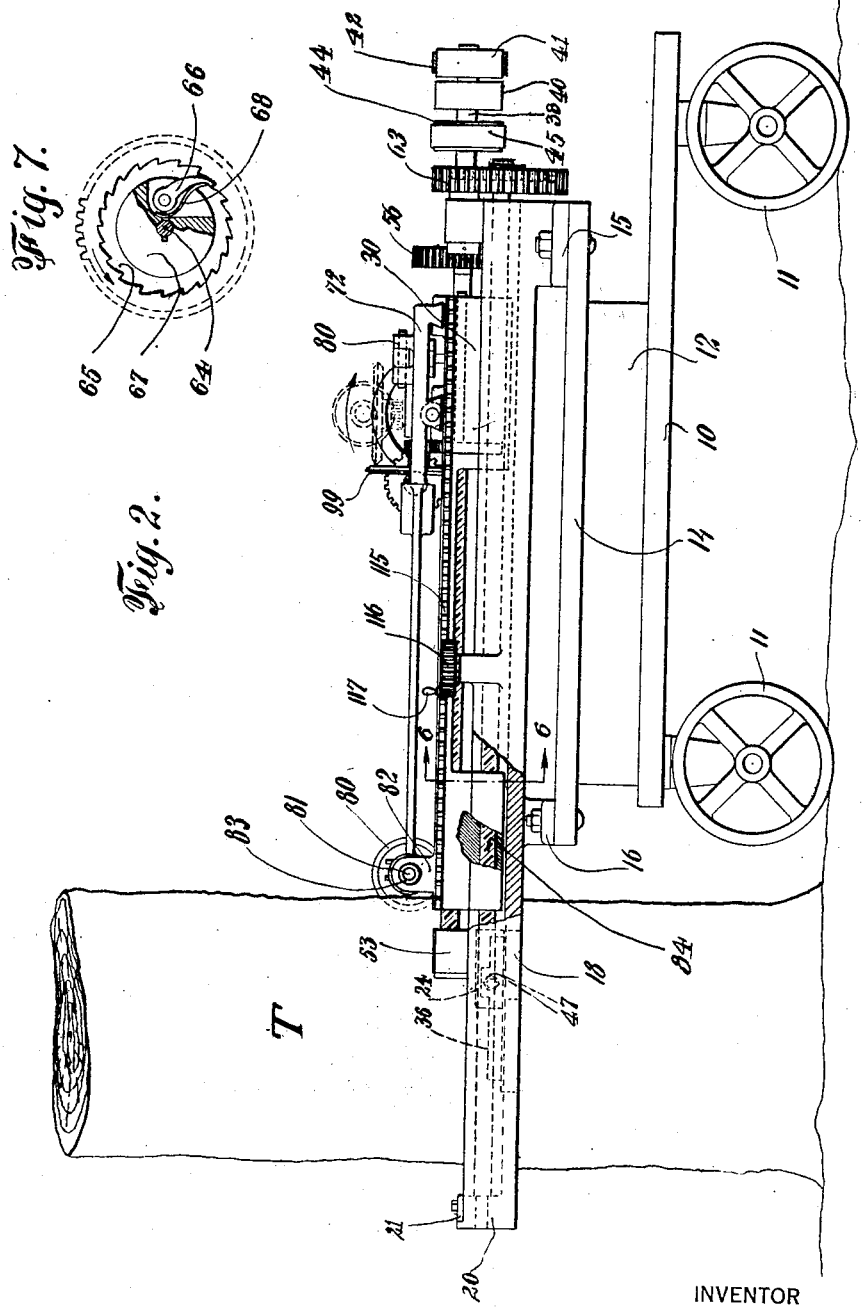

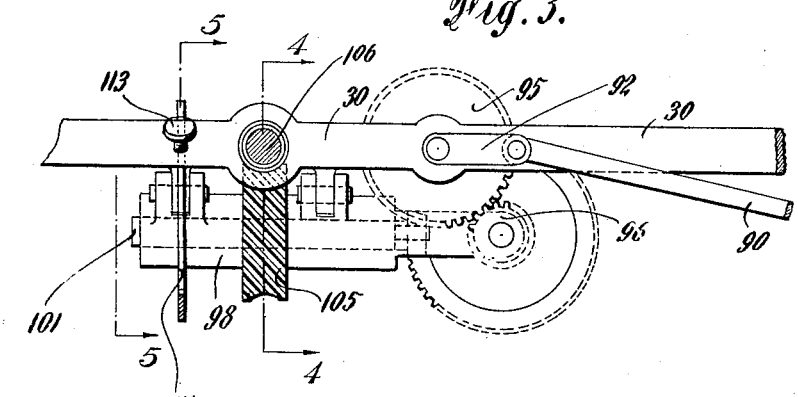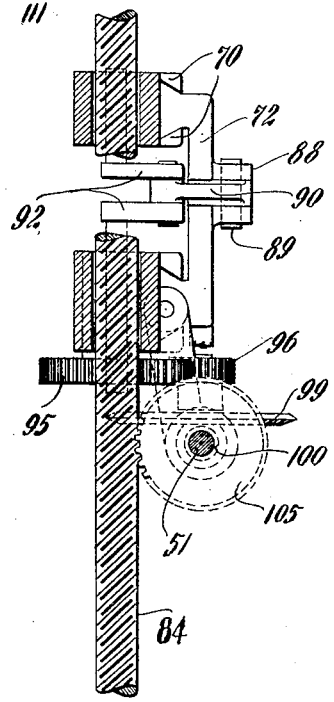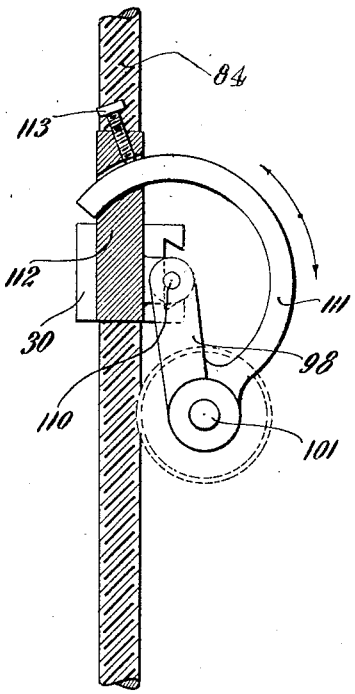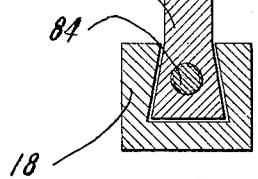

UNITED STATES PATENT OFFICE.

VASILY N. DMITRIFF, OF NEW YORK, N. Y., ASSIGNOR OF FORTY PER CENT. TO RUDOLPH KLIAVIN, OF SEATTLE, WASHINGTON.

TREE-SAWING APPARATUS.

1,337,395. Specification of Letters Patent. Patented Apr. 20, 1920.

Application filed May 21, 1919. Serial No. 298,629.

*To all whom it may concern:*

Be it known that I, VASILY N. DMITRIFF, a citizen of Russia, and residing at New York, in the county of New York and State of New York, have invented certain new and useful Improvements in Tree-Sawing Apparatus, of which the following is a specification.

This invention relates to improvements for felling trees, and has as its principal object the provision of an apparatus adapted to be driven by any convenient source of power, so that trees, even of large sizes, may be readily felled by the action of a saw driven reciprocatively.

A further object is to provide such apparatus in a form which may be readily transported the apparatus being readily positioned with reference to the tree to be cut.

These and other like objects are attained by the novel construction and combination of parts hereinafter described, and shown in the accompanying drawings, forming a material part of this disclosure, and in which—

Fig. 2 is a side elevational view of the same, parts being broken away in order to disclose the construction.

Fig. 3 is a fragmentary transverse sectional view, taken substantially on line 3—3 of Fig. 1.

Fig. 4 is a transverse sectional view taken on line 4—4 of Fig. 3.

Fig. 5 is a similar transverse sectional view taken on line 5—5 of Fig. 3.

Fig. 6 is a fragmentary sectional view taken on line 6—6 of Fig. 2, drawn to an enlarged scale, and Fig. 7 is a partial front view of the machine.

Figure 1:
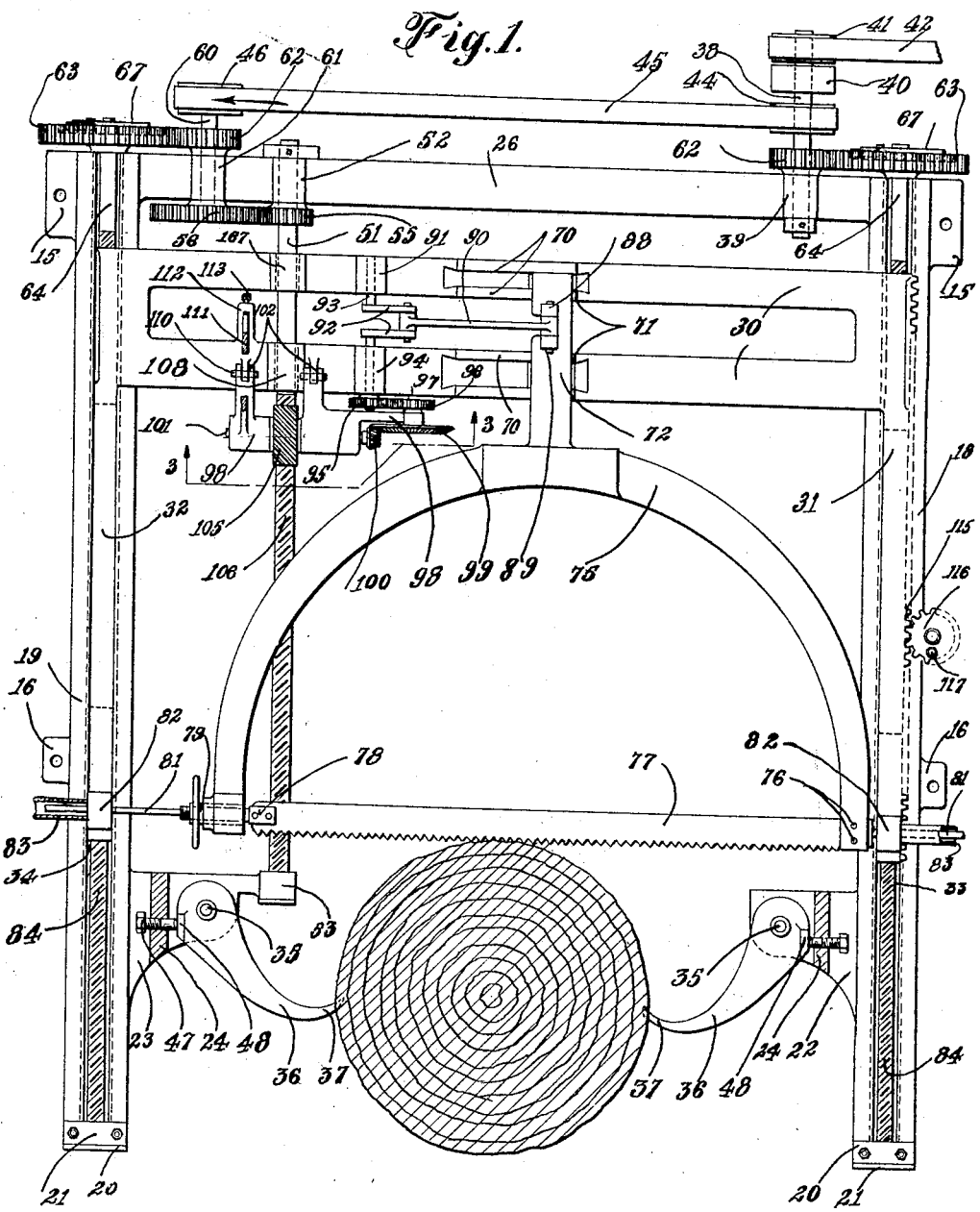
Figure 1 is a top plan view showing a tree felling apparatus made in accordance with the invention.

Extending inwardly from each of the beams 18 and 19 are rigid brackets 22 and 23 having raised walls 24 midway in their length and pivoted on pins 35 are opposed pairs of arcuate arms 36 terminating in spurs 37 adapted to be forced into the tree to be cut by screws 47 set in the walls 24 the points of the screws pressing against lugs 48 raised from the arms 36.

These beams, 18 and 19, are connected at the front by a cross rail 26, forming a rigid frame, and mounted upon the front end of the frame is a cross head 30, formed with extending arms 31 and 32, these arms having elements engageable with longitudinal recesses 33 and 34, formed respectively in the upper side of beams 18 and 19 and acting as guides for the cross head.

A shaft 38, journaled in a bracket 39, attached to the front rail 26, has at its outer end tight and loose pulleys, respectively 40 and 41, operated by a belt 42 from any convenient source of power. Fixed upon the shaft 38 is a pulley 44, over which runs a belt 45 to a similar pulley 46, rotatable upon a shaft 60 journaled in a bearing 61 extending up from the rail 26.

A shaft 51 is journaled in a bracket 52, formed with the rail 26, the extreme inner end of the shaft 51 being supported in a bearing 53, extending from the bracket 23. The shaft being driven by a spur pinion 55 meshing with the gear 56 fixed on the inner end of the short shaft 60.

Secured to the shafts 38 and 60 are spur gears 62 meshing with mating gears 63, fixed upon the outer ends of shafts 64, rotatable within the recesses 33 and 34, the extreme rear ends of the shafts being journaled in the bracket blocks 20.

Raised at a point near the center of the cross head 30, are longitudinal guides 70, arranged in pairs and having suited to them slides 71, the same being part of a carriage 72 carrying an arcuate frame 75, having one of its ends attached fixedly by rivets 76 to a saw blade 77, the other end of the blade being engaged in a holder 78, formed with a rod 79, passing through the other end of the frame and screw threaded to receive an internally threaded hand wheel 80, by means of which the saw blade may be tensioned or stressed as desired.

Extending outward from the ends of the saw frame are rods 81 sliding in blocks 82, formed at the outer ends of the arms 31 and 32, the extending ends of the rods 81 being protected by tubular extensions 83.

Reciprocative motion is conveyed to the saw in the following manner: Raised from the carriage 72 are brackets 88 through which passes a pin 89, the same engaging in the outer end of a connecting rod 90, having its opposite end pivotally connected to a crank 92 formed with a shaft 93, rotatable in bearings 94 on the cross head 30, the shaft extending through at the inner end, and having secured upon it a spur gear 95, driven by a pinion 96, fixed on a spindle 97, carried in the end of a bracket 98, and having on its inner side a bevel gear 99, driven by a pinion 100, mounted on a shaft 101, also journaled transversely in the bracket 98, the bracket being engaged by hinges 102 to one portion of the cross head 30.

Fixed upon the shaft 101 is a spiral gear 105, meshing with the poly-threaded worm 106, formed on the inner part of the shaft 51 which passes through brackets 107, and 108; thus the shaft 101 through its gear connections, actuates the crank and moves the carriage upon the cross head.

In order to maintain a proper working engagement between the teeth of the spiral gear 105 and worm 106, the bracket 98, as before stated, is hingedly engaged with the cross head 30 by pins 110, and has attached to it an arcuate arm 111, passing through an extension 112, of the cross head 30, the arm being clamped in position by a set screw 113, thereby maintaining the gears in operative condition.

In order to force the saw against the tree the gears 63 rotate freely on the shafts 64, and are formed with internal ratchet teeth 65, engageable with pawls 66 pivoted to disks 67 fixed upon the ends of the shafts, the pawls being normally pressed into engagement by springs 68. The shafts 64 are screw threaded at at 84, the threads engaging in the blocks 82 and ends of the cross head 30 by means of which the saw is forced against the tree.

The arm 31 is provided with rack teeth 115 upon its outer edge, engageable with a pinion 116, the same being operable by actuating the handle 117 to advance the cross head upon the beams 18 and 19 so as to retract the saw teeth when the tree is cut.

Having thus described my invention and set forth the manner of its construction and application, what I claim as new, and desire to secure by Letters Patent, is:—

1. In combination, a multiple threaded screw, a helical gear engaged with said screw, a spindle on which said gear is mounted, a hingedly mounted bracket carrying said spindle, means for raising or lowering said bracket relative to its support so as to move said gear into or out of engagement with said multi threaded screw, and means for locking said bracket when in an adjusted position.

2. In combination, a multiple threaded screw, a bracket hingedly mounted adjacent to said screw, a shaft in said bracket transverse to said screw, a curved arm formed with said bracket, a socket receptive of said curved arm, means for securing said curved arm in adjustment in said socket, and a helical gear carried on said shaft adapted to be adjustably engaged or disengaged with said screw.

In testimony whereof, I have signed my name to this specification this second day of May, 1919.

VASILY N. DMITRIFF.